United States Patent [19]
Alexander

[11] Patent Number: 5,769,100
[45] Date of Patent: Jun. 23, 1998

[54] SYNTHETIC HAIR-LIKE FUSER APPARATUS

[76] Inventor: Eugene D. Alexander, 7422 Eastern Ave. NW., Washington, D.C. 20012

[21] Appl. No.: 851,280

[22] Filed: May 5, 1997

Related U.S. Application Data

[63] Continuation of Ser. No. 422,841, Mar. 31, 1995, abandoned.

[51] Int. Cl.⁶ .................................................. A45D 20/08
[52] U.S. Cl. ........................ 132/271; 132/229; 132/232; 132/233; 219/225
[58] Field of Search ..................................... 132/271, 229, 132/232, 233; 219/225, 243; 7/157, 158, 900; 81/380, 379

[56] References Cited

U.S. PATENT DOCUMENTS

| | | | |
|---|---|---|---|
| 1,891,303 | 12/1932 | Cazes et al. | 132/148 |
| 1,899,190 | 2/1933 | Fogelin | 132/232 |
| 4,426,567 | 1/1984 | Gugliotti | 132/232 |
| 4,604,514 | 8/1986 | Thaler | 132/232 |
| 5,286,948 | 2/1994 | Landa et al. | 219/216 |
| 5,357,988 | 10/1994 | Nakamura et al. | 132/232 |

*Primary Examiner*—Gene Mancene
*Assistant Examiner*—Pedro Philogene
*Attorney, Agent, or Firm*—Antonelli, Terry, Stout, & Kraus, LLP

[57] ABSTRACT

A synthetic hair-like fuser apparatus for fusing the end of a braided synthetic hair-like material including a first elongated member and a second elongated member. The invention further includes a first fuser element attached to a first end of the first elongated member and a second fuser element attached to a first end of the second elongated member directly opposite the first fuser element. The first and second fuser elements both emanate heat. The second elongated member is pivotally connected to the first elongated member at a pivot point. Pivotal movement of the first and second elongated members relative to each other moves the first and second fuser elements from the open position to the closed position to contact opposite sides of the end of the braided material positioned between the fuser elements. Heat emanating from the fuser elements and pressure generated by further urging the fuser elements to the closed position fuses the end of the braided material.

26 Claims, 2 Drawing Sheets

SYNTHETIC HAIR-LIKE FUSER APPARATUS

This application is a continuation of application Ser. No. 08/422,841, filed on Mar. 31, 1995, now abandoned.

BACKGROUND OF THE INVENTION

The present invention is related to a method and apparatus for fusing the ends of braided extensions made of synthetic material. More particularly, the present invention is related to a hand-held fuser apparatus for fusing the ends of braided extensions made of synthetic hair like material.

Many women, men and children presently wear braided extensions in their hair to give the appearance of a fuller and longer head of hair. The braided extensions are made from synthetic hair-like material which softens when heat is applied.

The synthetic hair-like material, after being attached to and braided with existing hair must be terminated at the ends in order to prevent unravelling. Braiding as defined herein includes intertwining, twisting, knotting, interlocking and the like. The most common method of terminating the ends is by fusing the ends using heat. Several conventional processes are known for fusing the ends of braided extensions using heat. One such process involves burning the ends of the braided extensions using a cigarette lighter or a candle and compressing the softened material at the end of the braided extensions with ones fingertip. Fusing the ends of braided extensions using this process is time consuming, dangerous and somewhat expensive.

Another method for terminating the ends is to dip or apply glue to the ends of the braided extensions. This method is messy and time consuming.

SUMMARY OF THE INVENTION

The object of the present invention is to provide a fuser apparatus for neatly terminating the ends of braided extensions made of synthetic hair-like material.

Another object of the present invention is to provide a fuser apparatus for quickly and safely terminating the ends of braided extensions made of a synthetic hair-like material without great expense.

The above-described objects of the present invention are accomplished by a fuser apparatus for fusing the end of a braided synthetic hair-like material. The fuser apparatus includes a first elongated member, a second elongated member pivotally connected to the first elongated member at a pivot point, a first fuser element attached to a first end of the first elongated member and a second fuser element attached to a first end of the second elongated member directly opposite the first fuser element. The fuser elements can be constructed for attachment to the elongated members in such a manner that permits replacement of one or both of the fuser elements when damage occurs or the fuser elements become ineffective after extended use. The fuser elements can also be coated with a non-stick material to reduce sticking to the synthetic hair-like material.

Pivotal movement of the first and second elongated members by an operator relative to each other causes the first and second fuser elements to move from an open position to a closed position wherein the first and second fuser elements contact opposite sides of a end of the braided synthetic hair-like material. The first and second fuser elements apply heat to the end of the synthetic hair-like material causing the material at the end of the braid to soften (melt). When the end of the braid softens the operator further urges the first and second fuser elements to the closed position to compress the end of the braid. The heat and pressure applied in combination fuses the end of the synthetic hair-like material.

The first and second fuser elements each have a conical shape for compressing the end of the braided synthetic hair-like material softened by heat into a neat conically shaped termination. The first and second fuser elements are also provided with cutting edges to cut excess material from the end of the braid during fusing. The fuser elements can be formed into any desired cross section to shape the ends of the braided synthetic hair-like material into any desired shape. For example, the fuser elements can be formed to have a cylindrical cross section to form the ends of the synthetic hair-like material into a cylindrical shape to create a blunt or squared-off effect. Each fuser element is made of a metallic material which retains heat due to the application of heat from a heat source or generates heat in response to the application of electrical power. The electrical power is provided by a power supply attached to or integral with the first elongated member at a second end thereof. The power supply is connected to the first fuser element by a first connector which travels through or is attached to the first elongated member. The power supply is further connected to the second fuser element by a second connector which travels through or is attached to the first elongated member up to the pivot point and then travels through or is attached to the second elongated member beyond the pivot point.

The power supply makes use of standard household electricity or any other power source such as batteries or the like. If standard household electricity of one hundred and ten (110) volts AC is used then the power supply includes a transformer which steps down the 110 volts AC to twelve (12) volts DC.

A biasing member is provided between the first and second elongated members at the second ends thereof to bias the first and second elongated members to a position at which the first and second fuser elements are held at the open position. Holding the first and second fuser elements at the open position allows the fuser elements to receive the end of a braided synthetic hair-like material.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENT

Figure 1:
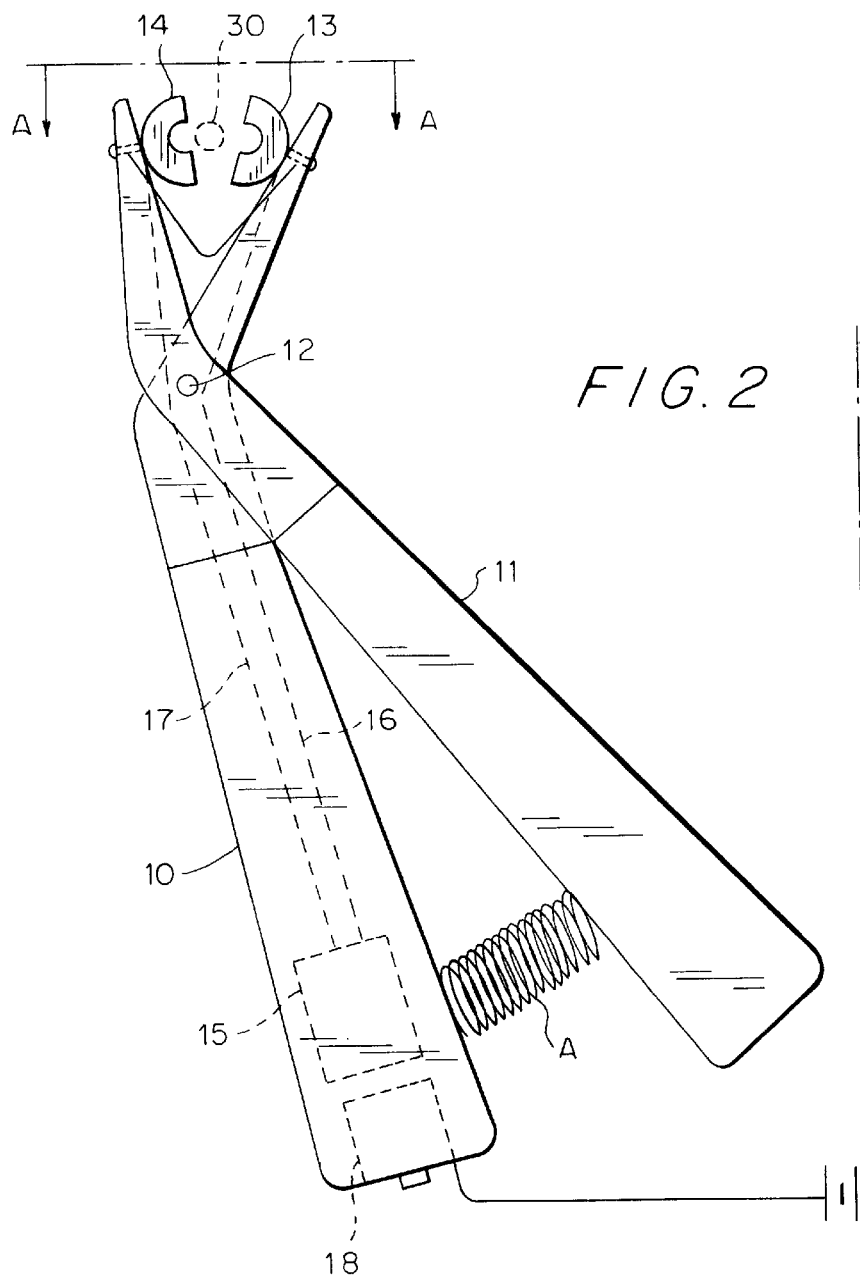
FIG. 1 is a plan view of the fuser apparatus of the present invention.
Figure 2:
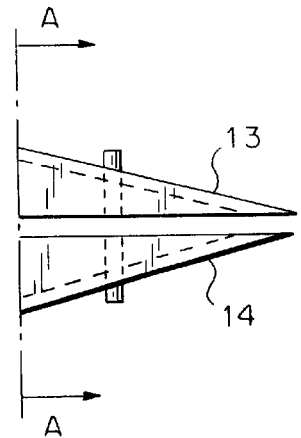
FIG. 2 illustrates the fuser elements of the present invention.
Figure 3:
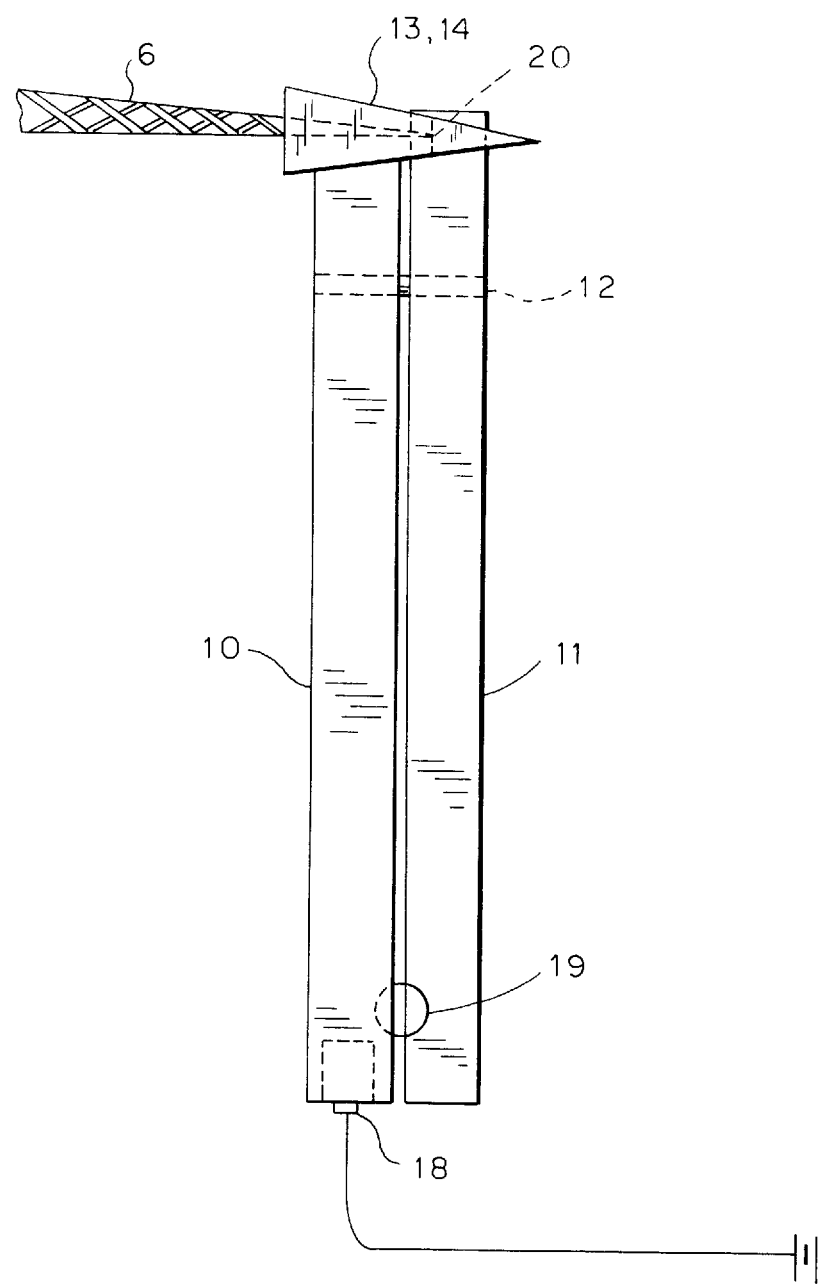
FIG. 3 illustrates a side view of the fuser apparatus of the present invention.

The fuser apparatus of the present invention as illustrated in FIGS. 1–3 fuses an end of a braided synthetic hair-like material into a neat conical shape. The fuser apparatus as illustrated in the plan view of FIG. 1 includes a first elongated member 10 and a second elongated member 11. The second elongated member 11 is pivotally connected to the first elongated member 10 at a pivot point 12. The pivot point 12 allows the first elongated member 10 and the second elongated member 11 to be pivotally moved relative to each other.

A first fuser element 13 is attached to a first end of the first elongated member 10 and a second fuser element 14 is attached to a first end of the second elongated member 11 directly opposite the first fuser element 13 attached to the first elongated member 10. When the fuser apparatus of the present invention is being operated heat is applied to or generated in the fuser elements 13 and 14 for use in the fusing operation.

The heat in the fuser elements 13 and 14 may be generated in the fuser elements 15 and 14 by any number of methods. Heat applied to the fuser elements 13 and 14 may be in the form of a flame or other high heat source. The flame or high heat source may be external of the fuser apparatus such as an open flame or may be internal of the fuser apparatus such as, for example, a butane lighter apparatus. Heat is generated by forming the fuser elements 13 and 14 from a material having high resistance (resistance heating elements) and applying electrical power. The following description is concerned with forming the fuser elements 13 and 14 from high resistance material and applying electrical power to the fuser elements 13 and 14 to generate heat. However, the invention is not limited thereto.

As illustrated in FIG. 1, the fuser elements 13 and 14 are electrical resistance heating elements which experience an increase in temperature when electrical power is applied. The electrical power applied to the fuser elements 13 and 14 is supplied by a power supply 15 through electrical connectors 16 and 17. Electrical connector 16 connects the power supply 15 to the first fuser element 13. The electrical connector 16 can be either threaded through the first elongated member 10 if the first elongated member is made of a tubular structure or attached to the outer surface of the first elongated member 10. The electrical connector 17 connects the second fuser element 14 to the power supply 15. The electrical connector 17 is either threaded through or is attached to the outer surface of the first elongated member 10 up to a location near the pivot point 12. Beyond the pivot point 12 the electrical connector 17 is either threaded through or attached to the outer surface of the second elongated member 11.

The power supply 15 can operate using standard household electricity of one hundred ten (110) volts AC or any other power source such as batteries or the like. If 110 volts AC is used in the power supply 15 then a transformer is provided in the power supply 15 so as to step down the 120 volts AC to 12 volts DC. The control of electrical power to the fuser elements 13 and 14 is provided by a switch 18. The switch 18 can have on and off positions and/or variable settings to obtain different temperatures at the fuser elements 13 and 14.

The first and second elongated members 10 and 11 are biased by a biasing member 19 in an outward direction of the second ends of the first and second elongated members 10 and 11 such that the fuser elements 13 and 14 remain in an open position when not being used to fuse the ends of a braided synthetic hair-like material. The biasing member 19 can be made of a spring or any other resilient material. Applying force by hand to the second ends of the first and second elongated members 10 and 11 in an inward direction causes pivotal movement of the first and second elongated members 10 and 11 relative to each other and causes the fuser elements 13 and 14 to move from the open position to a closed position. When the fuser elements 13 and 14 are in the closed position the fuser elements 13 and 14 are in contact with opposite sides of the end of a braided synthetic hair-like material.

FIG. 2 illustrates the fuser elements 13 and 14 as having a conical shape and cutting edges 20. The fuser elements 13 and 14 may be provided with a non-stick coating to reduce sticking of the synthetic hair-like material when softened to the fuser elements 13 and 14. Also the fuser elements 13 and 14 are constructed for attachment to the elongated members in such a manner to permit replacement of one or both of the fuser elements when damage occurs or the fuser becomes ineffective after extended use.

The fuser elements 13 and 14 when in the closed position and in contact with opposite sides of the end of a braided synthetic hair-like material heats the end of the braided synthetic hair-like material to soften it and compresses the softened material at the end of the braided synthetic hair-like material into a neat conical shape. The fuser elements 13 and 14 are also provided with cutting edges 20 for cutting excess material from the end of the braided synthetic hair-like material during the fusing operation. The fuser elements 13 and 14 can be formed into any desired cross section to shape the ends of the braided synthetic hair-like material into any desired shape. For example, the fuser elements can be formed to have a cylindrical cross-section to form the end of the braid into a cylindrical shape to create a blunt or squared off effect.

FIG. 3 illustrates a side view of the fuser apparatus of the present invention wherein the end of the braided synthetic hair-like material 30 is positioned within the fuser elements 13 and 14 and is fused thereby.

The fuser apparatus of the present invention as illustrated in FIG. 3 operates as follows. An operator of the fuser apparatus grabs the second ends of the first and second elongated members 10 and 11 and pivotally moves the second ends of the first and second elongated members 10 and 11 toward each other thereby moving the first and second fuser elements 13 and 14 from the open position toward the closed position. Moving the fuser elements 13 and 14 toward the closed position causes the fuser elements 13 and 14 to come into contact with and to encompass the end of the braided synthetic hair-like material 30 positioned between the fuser elements 13 and 14. When the first and second fuser elements 13 and 14 come in contact with the end of the braided synthetic hair-like material 30 the heat generated by the fuser elements 13 and 14 causes the end of the braided synthetic hair-like material 30 to soften. More pressure is applied by the operator by further urging the second ends of the first and second elongated members 10 and 11 toward each other. The softened material at the end of the braided synthetic hair-like material 30 is fused together as a result of the heat and pressure. The heat and pressure in combination with the cross-sectional shape of the fuser elements 10 and 11 forms the end of the braided synthetic hair-like material 30 into a conical shape. Also the cutting edge 20 of the fuser elements 13 and 14 cuts excess material form the end of the braided synthetic hair-like material. The operator then releases the second ends of the first and second elongated members 10 and 11 causing the fuser elements 13 and 14 to move to the open position thereby releasing the end of the braided synthetic hair-like material 30. Thus, the end of the braided synthetic hair-like material 30 is fused and terminated into a neat conical shape thereby preventing the unraveling thereof.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A synthetic hair fuser apparatus for fusing and terminating the an end of a braided synthetic hair-like material, comprising:

a first elongated member;

a second elongated member;

a first fuser element, attached to a first end of said first elongated member, emanating heat; and a second fuser element attached to a first end of said second elongated member directly opposite said first fuser element, emanating heat;

wherein said first and second fuser elements cooperate with each other to fuse and terminate the end of the braided synthetic hair-like material; and wherein said second elongated member being pivotally attached to said first elongated member at a pivot point such that pivotal movement of said first and second elongated members relative to each other moves said first and second fuser elements from an open position to a closed position adapted to contact with opposite sides of the end of the braided synthetic hair-like material which can be positioned between said first and second fuser elements to fuse and terminate the end using heat emanating from said first and second fuser elements.

2. A fuser apparatus according to claim 1, wherein said fuser elements are made of electrical resistance-type material that emanate heat upon application of an electric current; and wherein said fuser apparatus further comprises:

a power supply for supplying said electric current to said fuser elements.

3. A fuser apparatus according to claim 1 further comprising:

a biasing member, positioned between second ends of said first and second elongated members, for biasing said first and second elongated members to said open position.

4. A fuser apparatus according to claim 3 wherein, said biasing member is a spring.

5. A fuser apparatus according to claim 3 wherein, said biasing member is a resilient material.

6. A fuser apparatus according to claim 1 wherein, said fuser elements are detachable from said first and second elongated members to permit replacement thereof.

7. A fuser apparatus according to claim 6 wherein, said fuser elements each has a conical crossectional shape.

8. A fuser apparatus according to claim 1 wherein, said fuser elements each has a conical crossectional shape.

9. A fuser apparatus according to claim 1 wherein, said fuser elements each have a non-stick coating to reduce sticking of said braided synthetic hair material during fusing.

10. A fuser apparatus according to claim 6 wherein, said fuser elements each have a non-stick coating to reduce sticking of said braided synthetic hair material during fusing.

11. A fuser apparatus according to claim 7 wherein, said fuser elements each have a non-stick coating to reduce sticking of said braided synthetic hair-like material during fusing.

12. A fuser apparatus according to claim 8 wherein, said fuser elements each have a non-stick coating to reduce sticking of said braided synthetic hair material during fusing.

13. A fuser apparatus according to claim 1 wherein, said fuser elements each has a cylindrical cross-sectional shape.

14. A fuser apparatus according to claim 6 wherein, said fuser elements each has a cylindrical cross-sectional shape.

15. A fuser apparatus according to claim 13 wherein, said fuser elements each have a non-stick coating to reduce sticking of said braided synthetic hair material during fusing.

16. A fuser apparatus according to claim 14 wherein, said fuser elements each have a non-stick coating to reduce sticking of said braided synthetic hair material during fusing.

17. A fuser apparatus according to claim 1 wherein, each fuser element has a cutting edge which cooperates with the cutting edge of the other fuser element so as to cut excess material from the braided synthetic hair material during fusing.

18. A fuser apparatus according to claim 6 wherein, each fuser element has a cutting edge which cooperates with the cutting edge of the other fuser element so as to cut excess material from said braided synthetic hair material during fusing.

19. A fuser apparatus according to claim 7 wherein, each fuser element has a cutting edge which cooperates with the cutting edge of the other fuser element so as to cut excess material from said braided synthetic hair material during fusing.

20. A fuser apparatus according to claim 8 wherein, each fuser element has a cutting edge which cooperates with the cutting edge of the other fuser element so as to cut excess material from said braided synthetic hair material during fusing.

21. A fuser apparatus according to claim 9 wherein, each fuser element has a cutting edge which cooperates with the cutting edge of the other fuser element so as to cut excess material from said braided synthetic hair material during fusing.

22. A fuser apparatus according to claim 10 wherein, each fuser element has a cutting edge which cooperates with the cutting edge of the other fuser element so as to cut excess material from said braided synthetic hair material during fusing.

23. A fuser apparatus according to claim 11 wherein, each fuser element has a cutting edge which cooperates with the cutting edge of the other fuser element so as to cut excess material from said braided synthetic hair-like material during fusing.

24. A fuser apparatus according to claim 12 wherein, each fuser element has a cutting edge which cooperates with the cutting edge of the other fuser element so as to cut excess material from said braided synthetic hair material during fusing.

25. A fuser apparatus according to claim 13 wherein, each fuser element has a cutting edge which cooperates with the cutting edge of the other fuser element so as to cut excess material from said braided synthetic hair material during fusing.

26. A fuser apparatus according to claim 14 wherein, each fuser element has a cutting edge which cooperates with the cutting edge of the other fuser element so as to cut excess material from said braided synthetic hair material during fusing.

* * * * *